S. VREELAND.

Carriage-Wheels.

No. 5,237. Reissued Jan. 14, 1873.

WITNESSES. Thomas M. McGrain
Harry Smith

Simon Vreeland
by his Attys.
Howson and Son

UNITED STATES PATENT OFFICE.

SIMON VREELAND, OF POTTSTOWN, PENNSYLVANIA, ASSIGNOR, BY MESNE ASSIGNMENTS, TO METALLIC SUSPENSION-WHEEL COMPANY.

IMPROVEMENT IN CARRIAGE-WHEELS.

Specification forming part of Letters Patent No. 92,915, dated July 20, 1869; reissue No. 5,237, dated January 14, 1873.

*To all whom it may concern:*

Be it known that I, SIMON VREELAND, of Pottstown, county of Montgomery, State of Pennsylvania, have invented certain Improvements in Wheels for Vehicles, of which the following is a specification:

My invention consists of certain improvements in metallic wheels for vehicles, too fully explained hereafter to need preliminary description.

Figure 1:
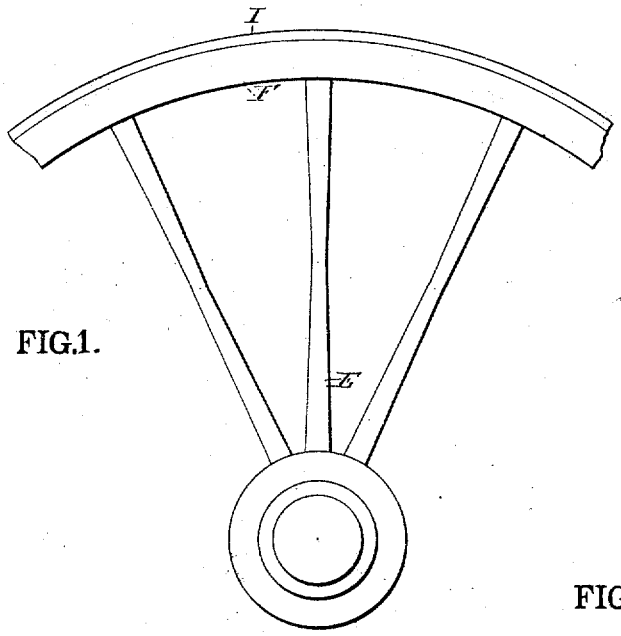
Figure 2:
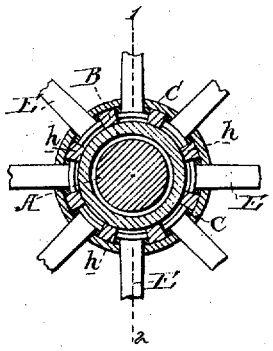

In the drawing, Figure 1 represents a side view of a portion of the wheel; Fig. 2, a transverse sectional view of the hub; Fig. 3, a section of the hub on the line 1 and 2; and Fig. 4, a section of the felly.

Figure 4:
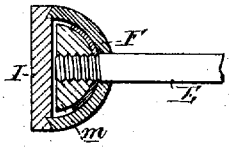
Figure 5:
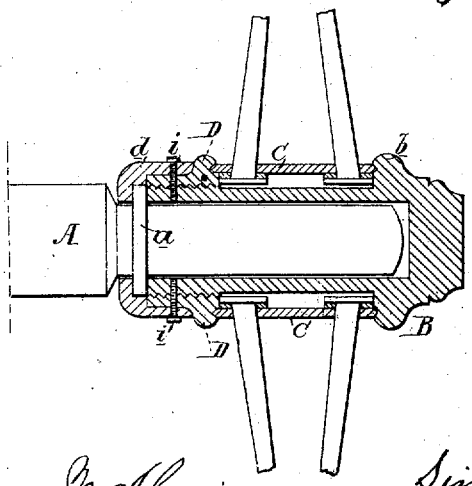

A represents the axle, and B the box. Near the outer end of the box is a flange, *b*, having a groove for receiving one end of a hollow cylinder, C, of wrought-iron or steel, the opposite end of the cylinder fitting into grooves in a screw ring or nut, D, having internal threads adapted to threads in the box, so that on screwing the nut D tight the cylinder will be securely held between it and the flange *b*. A ring, *d*, made in halves, is arranged to overlap a collar, *a*, on the axle A, and to fit over a portion of the nut D, to which the severed ring is secured. The felly of the wheel may be made in one or more pieces, and is of metal bent to the desired form, and on the felly is shrunk a steel tire, I, having internal grooves adapted to the bars, as shown in Fig. 4. The outer ends of the spokes are threaded and screwed into nuts *m* made to conform to the interior of the felly, between which and the nuts, however, may intervene thin strips of rubber. The inner ends of the spokes have square heads, between which and the interior of the cylinder may be interposed rubber washers, the spokes being passed through holes in the cylinder before the latter is secured to the box, and being screwed into the nuts of the felly until the hub is concentric with the same, when the box may be applied in a manner which will be readily understood. Before the cylinder is applied to the box, however, strips of hard wood *h h* (See Fig. 2) may be driven between the heads of the spokes to prevent the same from being turned.

It will be observed that the spokes E are enlarged at the opposite ends, a plan which I have found to be most effective in neutralizing the effect of the vibration of the spokes, which, but for the enlargement, would have a tendency to loosen the hold of the spokes in the felly and hub, the enlargements having a tendency to arrest the vibrations or diminish their effect on the nuts in the felly.

I claim as my invention—

1. The combination, substantially as described, of the metal spokes, enlarged at their opposite ends, with the metal felly and hub.

2. The severed ring *d*, adapted to a collar on the axle, in combination with the box B, its cylinder C, and nut D, as set forth.

3. The spokes having threaded ends, in combination with the felly having openings through which the said ends of the spokes pass, and with nuts adapted to the interior of the felly and securing the same to the spokes, substantially as described.

In testimony whereof I have signed my name to this specification in the presence of two subscribing witnesses.

SIMON VREELAND.

Witnesses:

WM. A. STEEL,
HARRY SMITH.